United States Patent
Widenhorn

Patent Number: 5,499,693
Date of Patent: Mar. 19, 1996

[54] METHOD AND APPARATUS FOR LUBRICATING THE BEARINGS OF A TURBOCHARGER

[75] Inventor: Markus Widenhorn, Oetwil, Switzerland

[73] Assignee: ABB Management AG, Baden, Switzerland

[21] Appl. No.: 399,040

[22] Filed: Mar. 6, 1995

[30] Foreign Application Priority Data

Apr. 2, 1994 [DE] Germany .................... 44 11 617.9

[51] Int. Cl.$^6$ .................................................. F01M 1/10
[52] U.S. Cl. .................... 184/6.24; 184/6.4; 210/108; 210/168; 210/195.1; 210/340; 210/741; 210/791
[58] Field of Search ................. 184/6.4, 6.11, 184/6.24, 108; 415/111, 112, 175; 123/196 A; 210/108, 168, 195.1, 340, 741, 791

[56] References Cited

U.S. PATENT DOCUMENTS

| | | |
|---|---|---|
| 4,033,870 | 7/1977 | Paquet et al. ............... 210/340 |
| 4,503,679 | 3/1985 | Saito et al. ............... 184/6.11 |

FOREIGN PATENT DOCUMENTS

| | | | |
|---|---|---|---|
| 63-78420 | 4/1987 | Japan ................... | 184/6.24 |
| 2162081 | 1/1986 | United Kingdom .......... | 210/108 |

Primary Examiner—Edward K. Look
Assistant Examiner—Christopher Verdier
Attorney, Agent, or Firm—Burns, Doane, Swecker & Mathis

[57] ABSTRACT

In a method and an apparatus for lubricating the bearings of a turbocharger, the coarsely filtered oil flow (2) for the turbocharger (7) is first of all passed through one of two fine filters (12, 15) connected alternately and in the process is filtered to the consistency required by the turbocharger (7). A portion of the finely filtered oil flow (20) is fed as lubricating oil (21) into the bearings (22) of the turbocharger (7), and the other portion is fed as flushing oil (23) into the clean side (14) of the second fine filter (15). Both the lubricating oil (21) and the flushing oil (23) are then drained off into the oil sump (1). If the first fine filter (12) is contaminated, the second fine filter (15) flushed beforehand by means of the finely filtered oil flow (20) is switched to the oil line (10) of the turbocharger (7) and thus takes over the cleaning function of the first fine filter (12). The clogged first fine filter (12) is then cleaned with the flushing oil (23). In this way, all lubricating points are supplied with lubricating oil of suitable consistency with relatively little expenditure terms of operating time and operating media.

6 Claims, 1 Drawing Sheet

METHOD AND APPARATUS FOR LUBRICATING THE BEARINGS OF A TURBOCHARGER

BACKGROUND OF THE INVENTION

1. Field of the Invention

The invention relates to a method and an apparatus for lubricating the bearings of a turbocharger with a portion of the lubricating oil of an internal combustion engine attached to the turbocharger.

2. Discussion of Background

It is known to supply the lubricating-oil circuit of a turbocharger with the lubricating oil of an internal combustion engine. The relatively large lubricating-oil flow of an internal combustion engine is only coarsely filtered, for instance with a mesh width of 50 μm. This is certainly adequate for most lubricating points, but not for the bearing arrangement of a turbocharger of high efficiency. The latter, on account of the relatively high rotary speeds and the narrow lubricating gaps, requires lubricating oil of finer consistency, which cannot be provided by the hitherto known lubricating-oil systems of internal combustion engines.

If the intention were to filter all the lubricating oil to the order of magnitude of about 5 to 10 μm required by the turbocharger, a plurality of fine filters would have to be installed. The filter cartridges would then become clogged very quickly on account of the resulting extreme increase in the cleaning volume, so that the lubrication of the turbocharger would be put at risk without the expensive exchange of the filter cartridges.

SUMMARY OF THE INVENTION

Accordingly, one object of the invention, in attempting to avoid all these disadvantages, is to provide a method and an apparatus for lubricating the bearings of a turbocharger with a portion of the lubricating oil of an internal combustion engine attached to the turbocharger, by which method and apparatus all lubricating points are supplied with lubricating oil of suitable consistency with relatively little expenditure in terms of operating time and operating media.

According to the invention, this is achieved in a method according to the preamble of claim 1 when the coarsely filtered oil flow for the turbocharger is first of all passed through one of at least two fine filters connected alternately and in the process is filtered to the consistency required by the turbocharger. A portion of the finely filtered oil flow is fed as lubricating oil into the bearings of the turbocharger, and the other portion is fed as flushing oil in counterflow direction through the second fine filter. Both the lubricating oil and the flushing oil are then drained off into the oil sump. If the first fine filter is contaminated, the second fine filter flushed beforehand by means of the finely filtered oil flow is switched to the oil line of the turbocharger and thus takes over the cleaning function of the first fine filter. The clogged first fine filter is then cleaned with the flushing oil.

To this end, a control valve, which is followed by a first fine filter, is arranged in the oil line leading to the turbocharger. A branch of the oil line to the turbocharger and respectively the clean side of a second fine filter of the same mesh width is formed downstream of this first fine filter. The dirty side of the second fine filter is connected via the control valve to a further return line leading to the oil sump.

It is particularly expedient if the permeability of the first fine filter is constantly monitored. The second fine filter is switched to the oil line of the turbocharger by actuating the control valve. This change-over is effected upon reaching a limit value which is governed by the requisite permeability of the first fine filter. Thus, each of the two fine filters alternately takes over the role of the other as a function of the permeability of the first respective fine filter.

Furthermore, it is advantageous when the monitoring of the permeability is effected by means of constant measurement of the oil pressure and when the actuation of the control valve is effected at a certain pressure difference, corresponding to the limit value, between the first and the last measurement of the oil pressure. To this end, a pressure gauge is arranged in the oil line leading to the turbocharger, between the fine filters and the turbocharger, which pressure gauge is connected to the control valve via an analyzing and regulating unit.

The advantages of the invention consist, inter alia, in the fact that only a fraction of all the lubricating oil, namely the oil flow of the turbocharger, is finely filtered, and therefore the filtering is relatively undemanding.

Maintenance-free operation of the system is guaranteed on account of the arrangement, according to the invention, of two fine filters connected alternately and their automatic change-over, effected by control valve, in accordance with the degree of contamination of the first respective fine filter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements essential for understanding the invention are shown. The internal combustion engine itself, for example, is not shown. The direction of flow of the operating medium is designated by arrows.

DESCRIPTION OF THE PREFERRED EMBODIMENT

Figure 1:
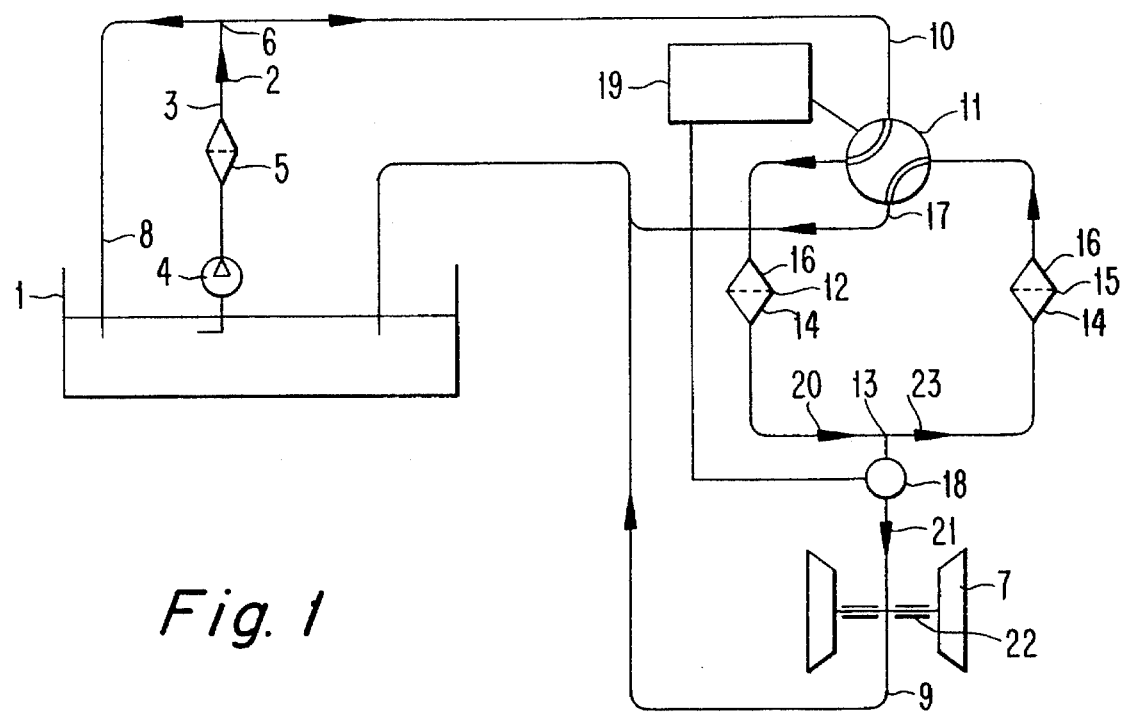
FIG. 1 shows a schematic representation of the lubricating-oil circuit of an internal combustion engine connected to a turbocharger.

Referring now to the drawings, wherein like reference numerals designate identical or corresponding parts throughout the several views, the lubricating-oil circuit in FIG. 1 consists of an oil sump 1, an oil pump 4 delivering the oil flow 2 from the oil sump 1 into the oil line 3, a coarse filter 5, a branch 6 of the oil line 3 to the internal combustion engine (not shown) and the turbocharger 7 respectively, and in each case a return line 8, 9 to the oil sump 1. A control valve 11 is arranged in the oil line 10 leading to the turbocharger 7 and is designed as a four-way valve. Following the control valve 11 is a first fine filter 12 having a mesh width of less than or equal to 10 μm. Formed downstream of the first fine filter 12 is a branch 13 of the oil line 10 to the turbocharger 7 and respectively the clean side 14 of a second fine filter 15 of the same mesh width. The dirty side 16 of the second fine filter 15 is connected via the four-way valve 11 to a further return line 17 leading to the oil sump 1 (FIG. 1).

Between the turbocharger 7 and the fine filters 12, 15, a pressure gauge 18 is arranged in the oil line 10 leading to the turbocharger 7 and is connected to the four-way valve 11 via an analyzing and regulating unit 19.

During operation of the internal combustion engine, the coarsely filtered oil flow 2 for the turbocharger 7 is first of all passed through the first fine filter 12 and in the process is filtered to a value of less than or equal to 10 μm. A portion (e.g. half) of the then finely filtered oil flow 20 is fed as lubricating oil 21 into the bearings 22 of the turbocharger 7, and the other half is fed as flushing oil 23 into the second fine filter 15. Both the lubricating oil 21 and the flushing oil 23 are then drained off to the oil sump 1.

Figure 2:
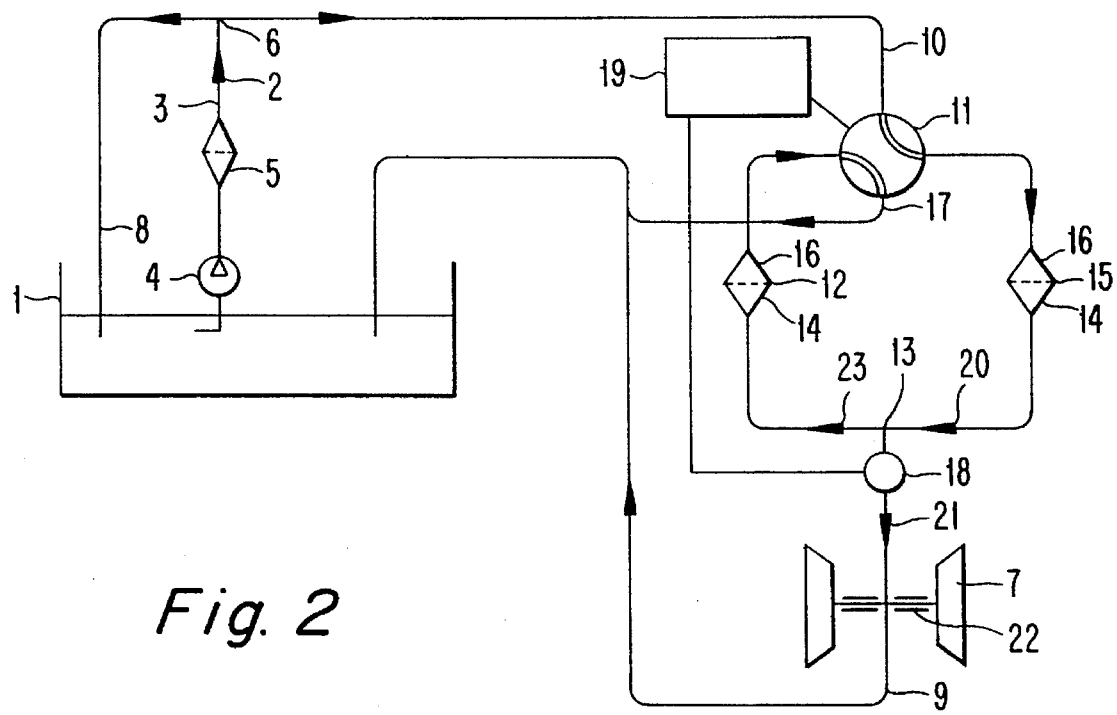
FIG. 2 shows a representation in accordance with FIG. 1, but after actuation of the control valve.

The permeability of the first fine filter 12 is monitored by means of constant measurement of the oil pressure. If the first fine filter 12 is contaminated, the second fine filter 15 flushed beforehand is switched to the oil line 10 of the turbocharger 7 by changing over the four-way valve 11, and the first fine filter 12 is cleaned with the flushing oil 23 (FIG. 2). The automatic change-over is effected upon reaching a limit value which is governed by the requisite permeability of the first fine filter 12 and is determined by the pressure difference between the first and the last measurement of the oil pressure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for lubricating bearings of a turbocharger with a portion of oil flow of an internal combustion engine attached to the turbocharger, in which the oil flow filtered in a coarse filter is pumped into bearings of the internal combustion engine and the bearing of the turbocharger respectively, and after the lubricating operation is drained off to oil sump in each case via a return line, wherein a) the coarsely filtered oil flow (2) for the turbocharger (7) is first of all passed through one of at least two fine filters (12, 15) connected alternately and in the process is filtered to a consistency required by the turbocharger (7), b) a portion of the finely filtered oil flow (20) is fed as lubricating oil (21) into the bearings (22) of the turbocharger (7), another portion is fed as flushing oil (23) into a clean side (14) of the second fine filter (15), and both the lubricating oil (21) and the flushing oil (23) are then drained off into the oil sump (1), c) if the first fine filter (12) is clogged, the second fine filter (15) flushed beforehand is switched to the oil line (10) of the turbocharger (7) and the first fine filter (12) is cleaned with the flushing oil (23).

2. The method as claimed in claim 1, wherein the permeability of the first fine filter (12) is constantly monitored, and the second fine filter (15) is switched to the oil line (10) of the turbocharger (7) by actuating a control valve (11), the change-over of the control valve being effected upon reaching a limit value which is governed by the requisite permeability of the first fine filter (12).

3. The method as claimed in claim 2, wherein the monitoring of the permeability is effected by means of constant measurement of the oil pressure and the actuation of the control valve (11) is effected upon reaching a certain pressure difference, corresponding to the limit value, between a first and a last measurement of the oil pressure.

4. An apparatus for lubricating bearings of a turbocharger with a portion of oil flow of an internal combustion engine attached to the turbocharger, comprising an oil sump, an oil pump delivering the oil flow from the oil sump into an oil line, a coarse filter, a branch of the oil line leading to the internal combustion engine and the turbocharger respectively, and in each case having a return line to the oil sump, wherein a) a control valve (11) is arranged in the oil line (10) leading to the turbocharger (7), following which control valve (11) is a first fine filter (12), b) a branch (13) of the oil line (10) to the turbocharger (7) and respectively a clean side (14) of a second fine filter (15) of the same mesh width as the first fine filter is formed downstream of the first fine filter (12), and c) a dirty side (16) of the second fine filter (15) is connected via the control valve (11) to a further return line (17) leading to the oil sump (1).

5. The apparatus as claimed in claim 4, wherein a pressure gauge (18) is arranged in the oil line (10) leading to the turbocharger (7), between the fine filters (12, 15) and the turbocharger (7), and this pressure gauge (18) is connected to the control valve (11) via an analyzing and regulating unit (19).

6. The apparatus as claimed in claim 4, wherein the control valve (11) is designed as a four-way valve.

* * * * *